Patented July 24, 1934

1,967,628

UNITED STATES PATENT OFFICE 1,967,628

WEED DESTROYING COMPOSITION

Carlton R. Rose, Berkeley, Calif.

No Drawing. Application July 31, 1933,
Serial No. 683,095

3 Claims. (Cl. 167—45)

This is a continuation in part of my application Serial No. 577,153, filed November 24th, 1931.

My invention relates to chemical compositions for destroying undesirable vegetation.

Such compositions are preferably applied by spraying; and since the leaves of the plants primarily are exposed to spray, there must be such leaf absorption as will carry the destructive agent to the plant roots, for it is only by destroying the roots that complete success can be had.

In the numerous weed destroying compositions heretofore used; arsenic has been a specially favored and common toxic agent. Various acids have also been used, noticeably, sulphuric acid, and in many compositions both arsenic and supplementary acid have been ingredients in the mixture. Although, in almost all instances, the form of arsenic so used has been the trioxid, arsenous acid ($As_2O_3$), a stronger form, the pentoxid, arsenic acid, ($As_2O_5$) appears in the prior art for suggested use in weed killers, either alone or combined with another acid among which sulphuric acid is mentioned, though, as far as I am aware, the specific combinative proportions of arsenic acid and sulphuric acid, essential for success, as I shall herein demonstrate, have never been disclosed nor used prior to my invention. I have found from long and extensive experience that weed destroying compositions comprising arsenous acid ($As_2O_3$) and a supplemental acid, whether such last named acid be sulphuric acid ($H_2SO_4$), or otherwise, are not successful; and the same is true of the use of arsenic acid ($As_2O_5$) alone, or even when combined with $H_2SO_4$, unless the latter ingredient be present in proper proportion, a condition which, as I have stated above has never, as far as I know, been disclosed or tried.

It is in this discovery of the critical proportion of the sulphuric acid in an arsenic acid composition, that my present invention resides.

The object of my invention is to insure the permanent destruction of the plant by depth of penetration of the composition adapted to effectually kill the roots in such measure that revival of the plant is practically impossible.

Such depth of penetration I have found, and have satisfactorily demonstrated by extensive use, is made possible by the critical proportion of the sulphuric acid ingredient of the composition. My invention may therefore be stated to consist in a spray solution of a mixture comprising arsenic acid and sulphuric acid in such proportions that said spray solution shall contain at least 1% sulphuric acid by weight. Such a spray solution may result from the amount of water used in the final dilution of the mixture required for spraying; or the necessary proportion of the sulphuric acid may be secured in the initial proportions of the two acids in a mixture, the dilution of which by water to form the final spray solution being proportionally regulated. Thus my invention in its preferred form may be stated further to consist in a practical commercial product adapted for spray dilution and comprising a substantially 75% solution of arsenic acid mixed in substantially equal volume with a substantially 99% solution of sulphuric acid. Though my composition is effective for destroying many weeds and other undesirable vegetation, its application to and destructive result upon the perennial plant morning-glory will best illustrate its nature and disclose it as a solution of the problem confronting farmers whose land is infested with this noxious weed.

Morning-glory has a root system extending from 15 to 20 feet or more into the ground, and with many lateral roots running horizontally in all directions. Several arsenic compositions previously used by me both with and without another acid, some even having sulphuric acid, killed the main tap-root to a depth of only three or four feet, the lateral roots usually escaping damage. The next year these lateral roots and all the tap roots which were not killed to the five foot level sent up new shoots and the weed infestation was nearly as bad as it was originally. I found that to be efficient a weed killer must kill the tap-roots to at least a depth of five feet and kill all the laterals above that level. Experiments leading to this discovery involved not only repeated changes and modifications of previous formulas, but also required considerable labor in that holes had to be dug to at least six feet to determine the depth of the root kills. I found in the course of these experiments that by increasing the amount of the oxidizing agent, namely the arsenic ingredient, there was an improvement in effectiveness, though even then it did not occur to me that if arsenic acid ($As_2O_5$) were used instead of arsenous acid ($As_2O_3$) a still further improvement might result, for I had many times tried arsenic acid and found it worthless. Nevertheless I was led to the conclusion that the killing agent should be arsenic acid and that it could be effective only because of the presence of sulphuric acid. It then remained to find the proper proportions.

In subsequent experiments, various proportions of sulphuric acid and arsenic acid were used, and the results were all judged by the kill obtained below the five foot level, including the lateral roots. From these experiments I discovered that the percentage of sulphuric acid in the spray mixture was an important factor. By the spray mixture, I mean the solution obtained by dilution with water and used as a spray. In short, enough sulphuric acid should be mixed with arsenic acid, so that when this mixture should be diluted with water, the resultant spray solution would be highly acid, at least 1% sulphuric acid or higher. No matter how much arsenic acid was in the spray mixture, if the sulphuric acid were low, the root kill would be poor, a fact which was firmly established.

As I have stated my experiments showed that arsenic acid by itself is worthless, and that sulphuric acid by itself is worthless, but that when these two chemicals are combined in the proper proportions, an effective weed killer is formed, one that will kill not merely the tops of the weeds, but will completely kill the main taproots of a perennial to a depth of five feet at least and all the laterals above that depth.

For a clearer understanding of the proper proportions upon which my present composition is based and for which a patent is sought, I give the following data in tabular form:

| | Mixture | | | Resulting | |
|---|---|---|---|---|---|
| | Arsenic acid $As_2O_5$ (75% sol) percent by volume | Sulphuric acid $H_2SO_4$ (99%) percent by volume | Dilution in water | Spray solution percent by weight content $As_2O_5$ | Results |
| | Percent | Percent | | Percent | |
| 1 | 90 | 10 | 1 in 100—1.2% | 0.18 | Very poor. |
| 2 | 90 | 10 | 1 in 10—10.0% | 1.5 | Fair. |
| 3 | 75 | 25 | 1 in 100—1.00% | 0.44 | Not good. |
| 4 | 75 | 25 | 1 in 50—1.91% | 0.81 | Better. |
| 5 | 66⅔ | 33⅓ | 1 in 100—0.88% | 0.58 | Not good. |
| 6 | 66⅔ | 33⅓ | 1 in 50—1.70% | 1.14 | Good. |
| 7 | 50 | 50 | 1 in 100—0.65% | 0.87 | Not good. |
| 8 | 50 | 50 | 1 in 75—0.87% | 1.16 | Good. |
| 9 | 50 | 50 | 1 in 50—1.27% | 1.70 | Excellent |
| 10 | 100 | Nil | All proportions. | | Very poor. |
| 11 | Nil | 100 | All proportions. | | Very poor. |

From this it will be seen that the higher percentages of sulphuric acid in the spray solution yield the better results. In #1 and #9, the arsenic acid content is about the same, but when only 0.18% sulphuric acid is present as in #1, the result is a failure; but when as in #9 it is 1.70% the result is perfect. Furthermore, comparing #5 and #8 in both of which the arsenic acid content is nearly the same, the result is improved by a higher sulphuric acid content. Again, comparing #4 and #9 it will be seen that in #4 the arsenic acid content is much higher than in #9 but the result is not as good because the sulphuric acid content is too low, while in #9 the result is perfect, as above stated.

As the best commercial product, I have adopted the 50—50 combination. By diluting this mixture with 50 parts of water a spray solution is obtained which contains sufficient arsenic acid and sulphuric acid, though it may be pointed out that even a more economical mixture may be had by increasing the sulphuric acid content and lowering the arsenic acid content, since the latter is more expensive than the former. I have also adopted for practical purposes the preliminary mixing of the two acid ingredients in equal volume solutions, one being a 75% solution of arsenic acid and the other a 99% solution of sulphuric acid, though, as I have pointed out, since the high sulphuric acid content is the critical factor in making the arsenic acid effective as a weed killer, the proportion of the sulphuric acid in the spray solution subsequently made by water dilution must contain at least 1% sulphuric acid by weight.

I claim:

1. A weed destroying concentrate comprising a mixture of arsenic acid and sulphuric acid whereby said mixture when diluted with sufficient water will yield a spray solution containing sufficient arsenic acid by weight to be herbicidal and at least one percent sulphuric acid by weight to obtain the necessary depth of penetration resulting in the killing of the weed roots.

2. A weed destroying composition comprising a substantially 75% solution of arsenic acid mixed in substantially equal volume with a substantially 99% solution of sulphuric acid, whereby depth of penetration resulting in the killing of the roots is obtained.

3. A weed destroying composition consisting of a mixture in substantially equal volume of a substantially 75% solution of arsenic acid and a substantially 99% solution of sulphuric acid, diluted with water in sufficient volume to form a spray solution containing at least 1% sulphuric acid by weight, whereby depth of penetration resulting in the killing of the roots is obtained.

CARLTON R. ROSE.